US010249432B2

United States Patent
Krupezevic et al.

(10) Patent No.: US 10,249,432 B2
(45) Date of Patent: Apr. 2, 2019

(54) INDUCTIVE ENERGY TRANSMISSION SYSTEM

(71) Applicant: Robert Bosch GmbH, Stuttgart (DE)

(72) Inventors: Dragan Krupezevic, Stuttgart (DE); Juergen Mack, Goeppingen (DE); Marcin Rejman, Waiblingen (DE); Martin Gonda, Bühl (DE)

(73) Assignee: ROBERT BOSCH GMBH, Stuttgart (DE)

( * ) Notice: Subject to any disclaimer, the term of this patent is extended or adjusted under 35 U.S.C. 154(b) by 202 days.

(21) Appl. No.: 15/505,549

(22) PCT Filed: Jul. 29, 2015

(86) PCT No.: PCT/EP2015/067389
§ 371 (c)(1),
(2) Date: Feb. 21, 2017

(87) PCT Pub. No.: WO2016/030114
PCT Pub. Date: Mar. 3, 2016

(65) Prior Publication Data
US 2017/0256355 A1    Sep. 7, 2017

(30) Foreign Application Priority Data

Aug. 29, 2014  (DE) .................. 10 2014 217 285

(51) Int. Cl.
*H01F 27/42*     (2006.01)
*G01R 31/06*    (2006.01)
(Continued)

(52) U.S. Cl.
CPC ............ *H01F 27/42* (2013.01); *G01R 31/06* (2013.01); *H01F 27/2828* (2013.01);
(Continued)

(58) Field of Classification Search
CPC ...... H01F 27/42; H01F 38/14; H01F 27/2828; H01F 27/33; H01F 27/34; G01R 31/06; H02J 5/005; H02J 7/025
See application file for complete search history.

(56) References Cited

U.S. PATENT DOCUMENTS

| 7,403,803 B2 | 7/2008 | Mickle et al. |
| 2010/0109445 A1 | 5/2010 | Kurs et al. |

(Continued)

FOREIGN PATENT DOCUMENTS

| CN | 102479603 A | 5/2012 |
| DE | 102008000922 A1 | 1/2009 |
| DE | 102011113740 A1 | 3/2013 |

OTHER PUBLICATIONS

International Search Report for PCT/EP2015/067389, dated Oct. 19, 2015.

*Primary Examiner* — Robert Deberadinis
(74) *Attorney, Agent, or Firm* — Norton Rose Fullbright US LLP; Gerard Messina

(57) ABSTRACT

An inductive energy transmission system including: a primary coil connectible to an electrical useful voltage source, the primary coil being connected to a first capacitor, the first capacitor being connected to a local ground potential of the energy transmission system; and a secondary coil inductively coupled to the primary coil; wherein a second capacitor is situated between the primary coil and the local ground potential of the energy transmission system.

12 Claims, 3 Drawing Sheets

(51) Int. Cl.
*H01F 38/14* (2006.01)
*H02J 5/00* (2016.01)
*H02J 7/02* (2016.01)
*H01F 27/28* (2006.01)
H01F 27/33 (2006.01)
H01F 27/34 (2006.01)

(52) U.S. Cl.
CPC .............. *H01F 38/14* (2013.01); *H02J 5/005* (2013.01); *H02J 7/025* (2013.01); *H01F 27/33* (2013.01); *H01F 27/34* (2013.01)

(56) References Cited

U.S. PATENT DOCUMENTS

2013/0127259 A1   5/2013   Lohr et al.
2014/0159501 A1   6/2014   Kanno et al.

INDUCTIVE ENERGY TRANSMISSION SYSTEM

FIELD OF THE INVENTION

The present invention relates to an inductive energy transmission system. Furthermore, the present invention relates to a method for manufacturing an inductive energy transmission system.

BACKGROUND INFORMATION

In inductive energy transmission, a spatial separation is fundamentally provided between a primary coil and a secondary coil. This spatial separation is primarily due to a freedom of positioning the contactless inductive energy transmission process or charging. Said spatial separation, however, may result in disadvantages especially for electromagnetic compatibility (EMC). This is essentially the result of the open type of construction of the transformer with the primary coil and the secondary coil. This is to be seen in contrast to a conventional transformer, which is well encapsulated and whose primary and secondary coils are situated as close to each other as possible.

This open type of construction results in the problem explained in the following with reference to FIG. 1. FIG. 1 shows a fundamental situational equivalent circuit diagram of the mentioned conventional "open construction type" during an EMC test scenario. A primary side resonant circuit may be seen that is formed by a primary coil 10, whose winding produces a resonant inductance, and a first capacitor 15, which produces a resonant capacitance. First capacitor 15 is connected to a local ground potential 16 of inductive energy transmission system 100. The primary-side resonant circuit is supplied by an exciting electrical useful voltage source $U_{Ex}$. The exciting useful voltage source $U_{Ex}$ provides an electrical useful signal for the inductive energy transmission system 100. The useful voltage source $U_{Ex}$ is overlaid with an electrical noise voltage source $U_S$, which represents all noise signals of the inductive energy transmission system 100. A noise signal in the sense of the present invention is to be understood primarily as common-mode noise. Generally, noise signals are understood both as common-mode noise and as differential-mode noise.

In terms of circuit technology, the two coils 10 and 20 respectively also form an electrode. With the primary coil and the secondary coil 10, 20, two electrodes are thus facing each other, between which a parasitic mutual capacitance 11 is situated. The parasitic mutual capacitance 11 is low primarily due to the wall thicknesses of the two housings of the coils 10, 20, common values of mutual capacitance 11 being between approximately 5 pF and approximately 25 pF. The two electrodes of coils 10, 20 respectively form a parasitic ground capacitance 12, 13 with respect to ground. Usual values for ground capacitances 12, 13 are in the range of approximately 20 pF to approximately 40 pF.

The secondary side of inductive energy transmission system 100 has an electronic load that is represented by a resistor 60 that is connected in parallel to secondary coil 20. The load may be for example an ohmic consumer (e.g. an incandescent lamp) or, as is usual in inductive chargers, an accumulator. The entire secondary system furthermore has another ground capacitance 14, which is connected to load 60 and to the ground potential.

FIG. 1 further shows a measuring resistor 40 of a radio measuring receiver that is required for EMC measurement. Measuring resistor 40 may be configured as a 50 ohm terminal resistor. The electrical voltage dropping on measuring resistor 40 is designated by $U_m$ and represents the electromagnetic noises on the radio measuring receiver.

The circuit configuration from FIG. 1 thus shows that the above-mentioned common-mode noise may cause electrical displacement currents that flow via ground capacitors 12, 13, 14 to ground. This is indicated by three closed circuits via ground capacitors 12, 13, 14 that are represented as dashed lines. The displacement currents flow on the ground via the radio measuring receiver back to noise voltage source $U_S$. The equivalent circuit diagram from FIG. 1 thus illustrates a coupling path of the noise via the ground capacitors 12, 13, 14.

SUMMARY OF THE INVENTION

It is thus an objective of the present invention to provide an improved inductive energy transmission system.

According to a first aspect, the objective is achieved by an inductive energy transmission system, having:
  a primary coil that is connectible to an electrical useful voltage source, the primary coil being connected to a first capacitor, the first capacitor being connected to a local ground potential of the energy transmission system; and
  a secondary coil inductively coupled to the primary coil; wherein a second capacitor is developed between the primary coil and the local ground potential of the energy transmission system.

In this manner, a bypass capacitor is implemented in terms of circuit engineering, as a result of which the aforementioned noise is hardly measurable anymore because an alternative path is created for the noise. This results in the creation of a very effective noise suppression method that advantageously allows for a standard-conforming design of the inductive energy transmission system.

According to a second aspect, the objective is achieved by a method for manufacturing an inductive energy transmission system, having the steps:
  providing a primary coil;
  connecting the primary coil to a first capacitor;
  connecting the first capacitor to a local ground potential of the energy transmission system;
  providing a secondary coil; and
  providing a second electrode of a second capacitor, the second electrode of the second capacitor being connected to the local ground potential.

Advantageous developments of the inductive energy transmission system and of the method are the subject matter of descriptions herein.

One advantageous development of the inductive energy transmission system is characterized by the fact that a first electrode of the second capacitor is formed by the primary coil and that a second electrode of the second capacitor is connected to the ground potential. This allows for the noise-suppressing bypass capacitor to be technically implemented in a simple manner.

Another advantageous development of the inductive energy transmission system is characterized by the fact that the second electrode of the second capacitor is developed in a layered manner, a conductive layer being respectively covered on opposite surfaces by an insulating layer. This advantageously makes it possible to increase an electrical breakdown strength of the second electrode.

Another advantageous development of the inductive energy transmission system is characterized by the fact that the conductive layer of the second capacitor is developed in a fleece-like manner from a carbon material. A conductive layer having a good noise-suppressing effect is thus provided.

Another advantageous development of the inductive energy transmission system is characterized by the fact that the conductive layer is developed to be woven or pressed. This provides alternative possibilities for the technical construction of the conductive layer. This supports a diverse freedom of design for the bypass capacitor.

Another advantageous development of the inductive energy transmission system provides for the conductive layer to be connected to the local ground potential by way of conductive reinforcement elements. This advantageously makes it possible to implement a mechanical reinforcement for the conductive layer and a possibility of an electrical contact between the conductive layer and the local ground potential.

Another advantageous development of the inductive energy transmission system provides for the second capacitor to have a capacitance value that is at least approximately twice, particularly approximately three times to approximately five times, even more particularly approximately six times to approximately ten times as great as a parasitic ground capacitance of the inductive energy transmission system. In this manner, favorable technical capacitance values are realized for the bypass capacitor.

In the following, the present invention is described in detail with additional advantages and features on the basis of several figures. In this connection, all described features are the subject matter of the present invention, irrespective of their representation in the specification and in the figures and irrespective of their antecedent reference in the descriptions herein. The figures are specifically intended to illustrate the principles that are essential to the present invention.

DETAILED DESCRIPTION

As an effective noise suppression measure, the present invention provides for the insertion of a bypass capacitor in the form of a second capacitor 50 into the primary circuit so as in this manner to keep the noises within the primary circuit. Second capacitor 50 conducts the noises directly back to the noise voltage source $U_S$ and thus effectively prevents an unwanted indirect coupling path of the noises. In order to achieve a significant bypass effect by way of second capacitor 50, its capacitance should be approximately twice, more particularly approximately three to approximately five times, particularly approximately six to approximately ten times as great as a ground capacitance of the entire system formed from parasitic ground capacitances 12, 13, 14.

Figure 1:
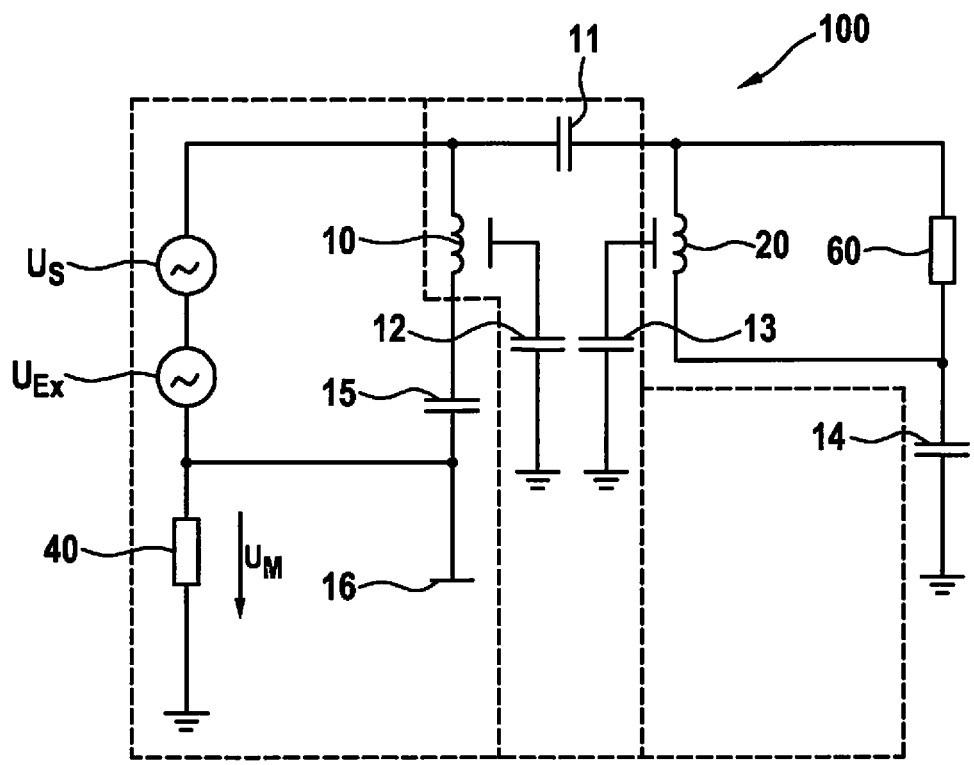
FIG. 1 shows a basic block diagram of a conventional inductive energy transmission system.
Figure 2:
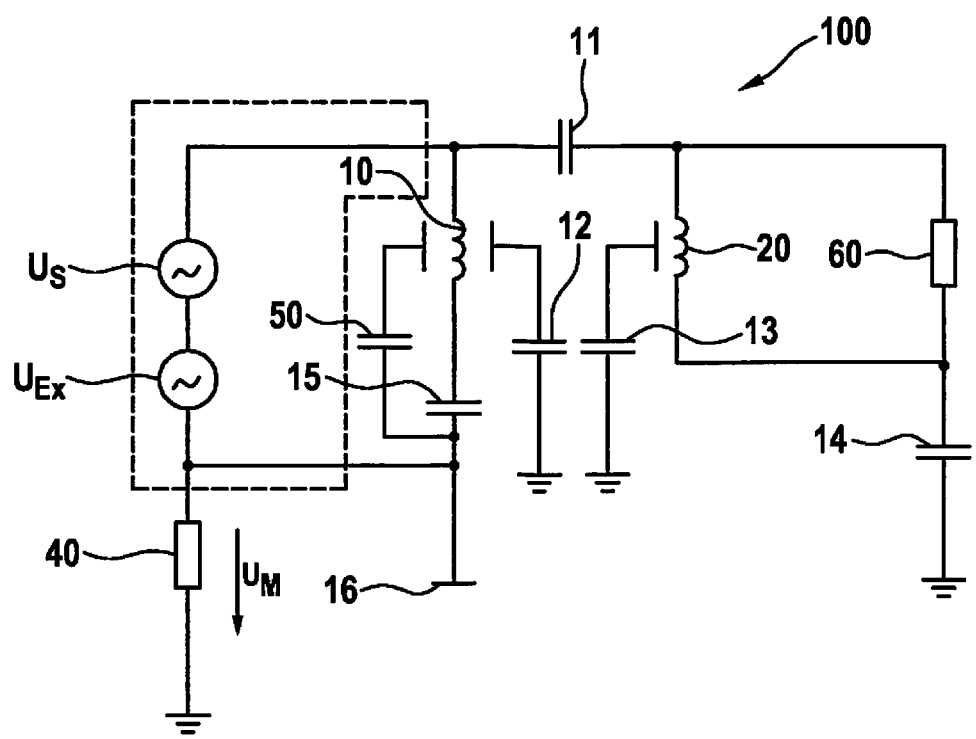
FIG. 2 shows a specific embodiment of an inductive energy transmission system according to the invention.

FIG. 2 shows a current path of the noise following the insertion of the bypass capacitor fundamentally as a closed circuit represented by a dashed line. The current path in effect forms a closed path via the useful voltage source $U_{Ex}$, the noise voltage source $U_S$, the primary coil 10 and second capacitor 50. The current path thus essentially no longer runs via measuring resistor 40, which allows the measurable noise to be reduced significantly.

In order to implement the bypass capacitor, a technical implementation of a second electrode 50a is required, after the first electrode of the bypass capacitor is formed by the winding of primary coil 10. For this purpose, it is provided to mount a conductive layer 90 in direct proximity to primary winding 10. It is furthermore important to design the capacitance of the bypass capacitor to be as high as possible, two essential factors that may influence said capacity being a maximization of the electrode surface and a minimization of the distance of the two electrodes with respect to each other.

Figure 3:
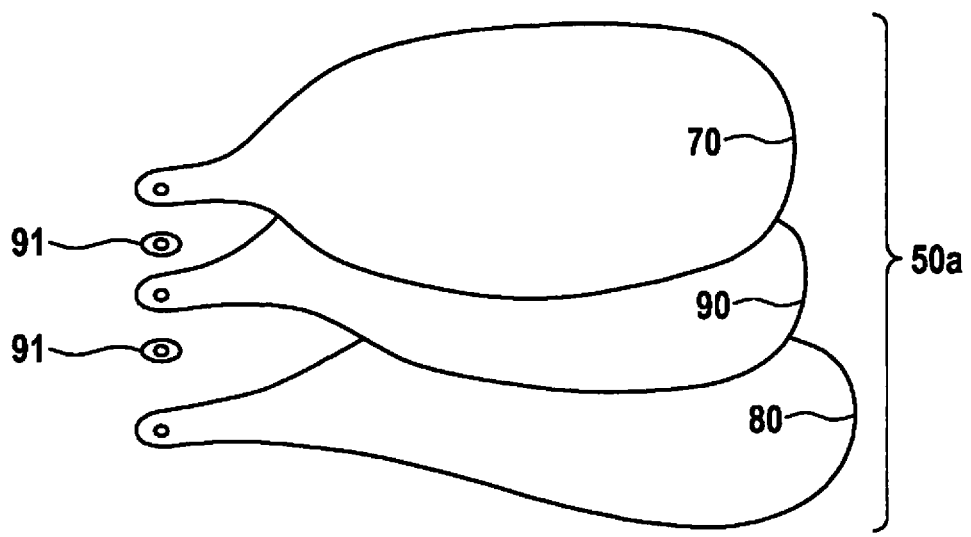
FIG. 3 shows a simplified representation of a possible implementation of a second electrode of the bypass capacitor.

FIG. 3 shows in a greatly simplified manner a fundamental technical specific embodiment of a second electrode 50a of second capacitor 50. The present invention may provide for two layers of insulating foils to be situated one upon the other, between which a conductive graphite or carbon layer is situated. The arrangement layered in this manner thus forms the second electrode 50a, which is conductively connected to the local ground terminal of first capacitor 15. In combination with the primary electrode of primary coil 10, the noise suppressing bypass capacitor is implemented in this manner.

In principle, any conductive material may be used for conductive layer 90 of electrode 50a with the exception of metallic, in particular ferromagnetic material since this material would produce unwanted eddy current and hysteresis losses.

Test series have shown that using a conductive layer or electrode in the form of a graphite or carbon layer as conductive layer 90 provides the best results for an optimized noise-suppression effect of second capacitor 50. For this purpose, the graphite layer may be developed advantageously by a lacquer. Particularly advantageously, the graphite layer is configured as a carbon fiber weave or a fleece-like fiber fabric, it being possible for conductive layer 90 to be woven or pressed in a fleece-like manner as a fleece-like carbon material. The second electrode 50a of the bypass capacitor formed in this manner is connected in an electrically conductive manner to a fixed reference point, normally the local ground potential 16 of first capacitor 15 of inductive energy transmission system 100.

As a mechanical reinforcement of conductive layer 90, it is possible to use electrically conductive reinforcement rings 91, which are made of aluminum or copper and which are provided for a mechanical reinforcement of conductive layer 90 and an improved electrical contact between electrode 50a and ground potential 16.

Figure 4:
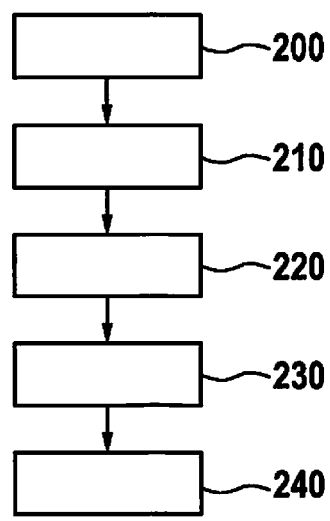
FIG. 4 shows a basic sequence of one specific embodiment of the method according to the invention.

FIG. 4 shows in principle a sequence of a specific embodiment of the method of the present invention.

A primary coil 10 is provided in a first step 200.

In a second step 210, primary coil 10 is connected to a first capacitor 15.

In a third step 220, first capacitor 15 is connected to a local ground potential 16 of energy transmission system 100.

In a fourth step 230, a secondary coil 20 is provided.

Finally, in a fifth step 240, a second electrode 50a of a second capacitor 50 is provided, second electrode 50a of second capacitor 50 being connected to local ground potential 16.

Advantageously, inductive energy transmission system 100 may be used in any technical systems in which contactless inductive charging occurs, for example in an electric toothbrush, an electric car etc.

In summary, the present invention provides an improved inductive energy transmission system that advantageously returns electromagnetic noises essentially to the source of the noise and thereby optimizes the efficiency of the inductive energy transmission system.

One skilled in the art, in proceeding, will implement specific embodiments of the present invention that are not described, or only partially described, without deviating from the core of the present invention.

What is claimed is:

1. An inductive energy transmission system, comprising:
   a primary coil that is connectible to an electrical useful voltage source, the primary coil being connected to a first capacitor, the first capacitor being connected to a local ground potential of the energy transmission system; and
   a secondary coil inductively coupled to the primary coil;
   wherein a second capacitor is between the primary coil and the local ground potential of the energy transmission system.

2. The inductive energy transmission system of claim 1, wherein a first electrode of the second capacitor is formed by the primary coil and a second electrode of the second capacitor is connected to the local ground potential.

3. The inductive energy transmission system of claim 1, wherein the second electrode of the second capacitor is configured in layers, a conductive layer being covered on opposite surfaces by respectively one insulating layer.

4. The inductive energy transmission system of claim 3, wherein the conductive layer of the second capacitor is configured in a fleece-like manner from a carbon material.

5. The inductive energy transmission system of claim 3, wherein the conductive layer is configured to be woven or pressed.

6. The inductive energy transmission system of claim 3, wherein the conductive layer is connected to the local ground potential by conductive reinforcement elements.

7. The inductive energy transmission system of claim 1, wherein the second capacitor has a capacitance value that is at least approximately twice as great as a parasitic ground capacitance of the inductive energy transmission system.

8. The inductive energy transmission system of claim 1, wherein the second capacitor has a capacitance value that is at least approximately six times to approximately ten times as great as a parasitic ground capacitance of the inductive energy transmission system.

9. The inductive energy transmission system of claim 1, wherein the second capacitor has a capacitance value that is at least approximately three times to approximately five times as great as a parasitic ground capacitance of the inductive energy transmission system.

10. A method for manufacturing an inductive energy transmission system, the method comprising:
    providing a primary coil;
    connecting the primary coil to a first capacitor;
    connecting the first capacitor to a local ground potential of the energy transmission system;
    providing a secondary coil; and
    providing a second electrode of a second capacitor, the second electrode of the second capacitor being connected to the local ground potential.

11. The method of claim 10, wherein the second electrode is configured in layered fashion having a conductive layer and respectively one insulating layer on opposite surfaces of the conductive layer.

12. The method of claim 11, wherein the conductive layer is configured as a fleece-like fabric made of a carbon material.

* * * * *